United States Patent
Shaw et al.

(10) Patent No.: US 6,214,309 B1
(45) Date of Patent: *Apr. 10, 2001

(54) SINTERABLE CARBIDES FROM OXIDES USING HIGH ENERGY MILLING

(75) Inventors: Leon L. Shaw; Ruiming Ren; Zhenguo Yang, all of Storrs, CT (US)

(73) Assignee: University of Connecticut, Storrs, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/936,868

(22) Filed: Sep. 24, 1997

(51) Int. Cl.$^7$ ..................................................... C01B 21/36
(52) U.S. Cl. ........................... 423/345; 423/439; 423/440
(58) Field of Search ........................... 423/345, DIG. 15, 423/439, 440

(56) References Cited

U.S. PATENT DOCUMENTS

| | | | |
|---|---|---|---|
| 4,742,029 | 5/1988 | Kurachi et al. | 423/345 |
| 4,784,839 | * 11/1988 | Bachelard et al. | |
| 4,851,203 | * 7/1989 | Bachelard et al. | |
| 4,891,341 | * 1/1990 | Cutler et al. | |
| 5,030,286 | 7/1991 | Crawford et al. | 423/335 |
| 5,037,626 | * 8/1991 | Ho et al. | |
| 5,190,737 | * 3/1993 | Weimer et al. | |
| 5,338,523 | * 8/1994 | Krstic. | |
| 5,340,417 | * 8/1994 | Weimer et al. | |
| 5,380,688 | * 1/1995 | Dunmead et al. | 501/87 |
| 5,417,952 | * 5/1995 | Koc et al. | |
| 5,523,269 | * 6/1996 | Morgan et al. | |
| 5,525,556 | * 6/1996 | Dunmead et al. | |
| 5,538,675 | * 7/1996 | Dunmead et al. | |
| 5,651,950 | 7/1997 | Lee et al. | 423/345 |

FOREIGN PATENT DOCUMENTS

| | | | |
|---|---|---|---|
| 0 371 885 | * | 6/1990 | (EP) . |
| 2 351 050 | * | 12/1977 | (FR) . |
| 811906 | * | 4/1959 | (GB) . |
| 63-201009 | * | 8/1988 | (JP) . |
| WO 91/19584 | * | 12/1991 | (WO) . |

OTHER PUBLICATIONS

D.R. Maurice and T.H. Courtney, "The Physics of Mechanical Alloying: A First Report", *Metallurical Transactions A*, vol. 21A, Feb. 1990, pp. 289–303.

L. Lü and M. O. Lai, *Mechanical Alloying*, pp. 11–21 No Date.

A. Biswas, G. K. Dey, A. J. Haq, D. K. Bose, and S. Banerjee, A Study of solid–state amorphization in Zr–30 at. % Al by mechanical attrition, *J. Mater. Res.*, vol. 11, No. 3, Mar. 1996, pp. 599–607.

M. Sherif El–Eskandarany, "Mechanical solid state reaction for synthesis of β–Sic powders", *J. Mater. Res.*, vol. 10, No. 3, Mar. 1995, pp. 659–667.

L. Lü M. O. Lai, *Mechanical Alloying*, pp. 28–41 No Date.

Zhen–Guo Yand and L. L. Shaw, "Synthesis of Nanocrystalline SiC at Ambient Temperature Through High Energy Reaction Milling", *NanoStructured Materials*, vol. 7, No. 8, pp. 873–886, 1996.

* cited by examiner

*Primary Examiner*—Steven P. Griffin
*Assistant Examiner*—Stuart L. Hendrickson
(74) *Attorney, Agent, or Firm*—Cantor Colburn LLP

(57) ABSTRACT

A method for the synthesis of micron- and submicron-sized, nanostructured metal carbide powders, comprising high energy milling of metal oxide and carbon precursors followed by annealing of the as-milled powders. The annealing is preferably carried out under a flow of inert gas or subatmospheric pressure to drive the reaction to completion in one to two hours. The powders thus synthesized comprise high purity particles having a narrow particle size range.

41 Claims, 4 Drawing Sheets

SINTERABLE CARBIDES FROM OXIDES USING HIGH ENERGY MILLING

BACKGROUND OF THE INVENTION

1. Field of the Invention

This invention relates to carbide powders. In particular, this invention relates to a method for synthesizing micron- and submicron-sized, high purity, high surface area, nanostructured carbide powders from oxides using a high energy milling step.

2. Brief Description of the Prior Art

Micron-, submicron-, and nanosized carbide powders are important materials for engineering applications. As used herein, "micron-sized" powders refers to powder particles wherein the mean particle size is equal to or greater than about 1.0 micron. "Submicron-sized" powders refers to powder particles wherein the mean particle size is in the range from about 0.1 to about 1.0 microns. "Nanosized" powders refers to powder particles wherein the mean particle size is less than about 0.1 micron (about 100 nm). In certain instances, micron- and submicron-sized particles comprise many nanosized crystalline grains rather than a single, large grain. In these cases, the particles are referred to as "micron- and/or submicron-sized particles with nanostructures" or "micron- and/or submicron-sized, nanostructured particles". Nanosized and micron- and/or submicron-sized, nanostructured particles have a high fraction of atoms located at the grain boundaries of the particle. Such materials accordingly have different, and often advantageous properties compared to conventional particles having the same chemical compositions.

Currently, the primary process for the production of micron- and submicron-sized carbide powders is high-temperature, carbothermic reduction of the corresponding oxides by carbon powders. For example, most industrial silicon carbide (SiC) powders are manufactured via the Acheson process through carbothermic reduction of silicon dioxide ($SiO_2$) by carbon powder at temperatures up to 2000–2300° C. for 30 hours. A carbothermic method based on reduction of one or more metal oxides reacted with a binder material and a source of carbon is disclosed in U.S. Pat. No. 4,784,839 to Bachelard et al. Similarly, as described in UK Patent No. 811,906 (issued in 1959), industrial titanium carbide (TiC) powders are produced through reduction of titanium dioxide ($TiO_2$) by carbon at temperatures ranging from 1700 to 2100° C. for 10–20 hours. U.S. Pat. No. 5,417,952 to Rasit et al. discloses carbothermic reduction of a titanium precursor after pyrolytic deposition of the titanium.

Advantages of using high-temperature carbothermic reduction for the production of carbides include low cost of the oxide raw materials, and ease in scale-up for tonnage-level production. However, the final products have a wide range of particle sizes, and moreover are normally larger than one micron, due to high reaction temperatures and long reaction times. Milling after carbothermic reduction is required. Undesirable inhomogeneities are also frequently found in the stationary reaction mix. These inhomogeneities are due to diffusion gradients established during the reduction reaction, and require extensive milling and purification procedures in order to convert the as-synthesized products into high quality, sinterable powders. The SiC powder produced by the Acheson process, for example, has a large grain size and is contaminated with oxygen. Accordingly, there remains a need for a method whereby homogenous carbide powders may be produced having a controlled and uniform size, without extensive milling and purification procedures.

SUMMARY OF THE INVENTION

The above-described drawbacks and deficiencies of the prior art are alleviated by the method of manufacture of the present invention, wherein carbide powders are produced from their corresponding oxides using high energy milling of selected oxide powders with carbon powder at ambient temperature, followed by heating the milled powder mixture to between 500 and 1500° C. Preferably, carbon monoxide is removed from the reaction chamber during heating in order to drive the reaction to completion at low temperatures and/or short times. The high energy milling step serves to mix the oxide and carbon on a nanosized scale and to increase the reactivity of the reactants by increasing surface area, introducing structural defects and internal strains, and transforming the crystalline materials to an amorphous state. The method in accordance with this invention produces high purity, high surface area, micron- or submicron-sized carbide powders having a narrow particle size distribution and internal nanostructures. The method is conducted at low temperatures, for short processing times, and thus significantly lower cost.

DETAILED DESCRIPTION OF THE INVENTION

The method of manufacture of the present invention comprises two steps: first, high energy milling of selected oxide powders with carbon powder at ambient temperature for about 2 to 48 hours; and secondly, annealing the powder to produce the corresponding carbides. Heating the milled powder mixture at a temperature between 500 and 1500° C. for about one to two hours produces submicron-sized, nanostructured powders, while heating at a higher temperatures (about 1500–1800° C.) will lead to grain growth and produce micron-sized powders. During heating, subatmospheric pressure or a flowing argon atmosphere is preferably maintained, thereby removing carbon monoxide gas from the reaction chamber and driving the reaction to completion. The high purity carbide powders thus produced comprise homogenous particles with a narrow particle size distribution.

The overall stoichiometric reaction for the method in accordance with the present invention can be expressed generally as:

$$M_xO_y + (z+y)C = M_zC_z + yCO \quad (1)$$

where M represents the metal element, and x, y and z are constants. Thus, for SiC synthesis equation (1) is:

$$SiO_2(s) + 3C(s) = SiC(s) + 2CO \quad (2)$$

Synthesis of TiC is:

$$TiO_2(s) + 3C(s) = TiC(s) + 2CO(g) \quad (3)$$

Synthesis of $Cr_3C_2$ is:

$$3Cr_2O_3(s) + 13C(s) = 2Cr_3C_2 + 9CO(g) \quad (4)$$

Carbides amenable to synthesis using the method of the present invention include, but are not limited to those based on silicon, titanium, thorium, hafnium, vanadium, chromium, tungsten, tantalum, niobium, zirconium, and the like, for example, SiC, TiC, VC, HfC, $ThC_2$, ThC, $Cr_3C_2$ WC, $W_2C$, ZrC, TaC, $Ta_2C$, and NbC. Carbide composite powders (of two or more carbides) may also be formed by high energy milling of the corresponding metal oxides and carbon. Adjustment of the molar ratio of the starting oxides leads to composite powders having each of the carbides at a given volume fraction.

The first step requires high energy milling of selected oxide powders with a source of carbon for 2 to 48 hours at ambient temperature. The milling is preferably conducted in an inert atmosphere (e.g., an argon gas atmosphere) using methods and equipment known in the art, such as an attritor, vibratory mill, or horizontal ball mill. Dry milling as shown in Example 1 is preferred. Use of attritors and horizontal ball mills are preferable for tonnage-level production. The carbon source could be graphite, coal, plant carbon, thermal black, acetylene black, coke, or combinations thereof, or other sources known in the art, depending on the required purity of the final products. The milling step is important in that it reduces all powder particles to submicron size, transforms most of the powders to an amorphous state, and provides a uniform mixing of carbon with oxides on a nanometer scale.

Figure 1:
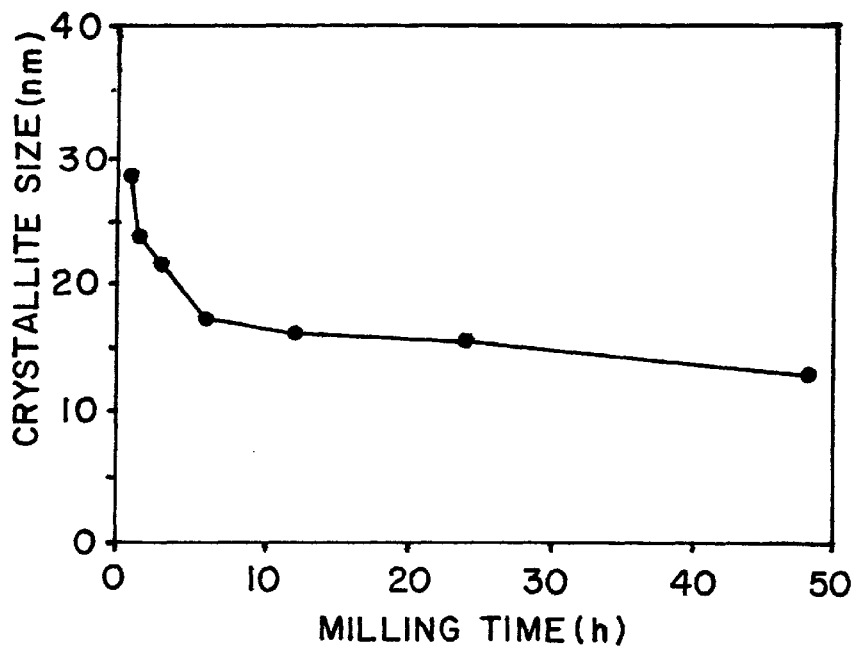
FIG. 1 is a graph showing the effect of milling time on crystallite size of $SiO_2$ in as-milled $SiO_2$/graphite powder.
Figure 2:
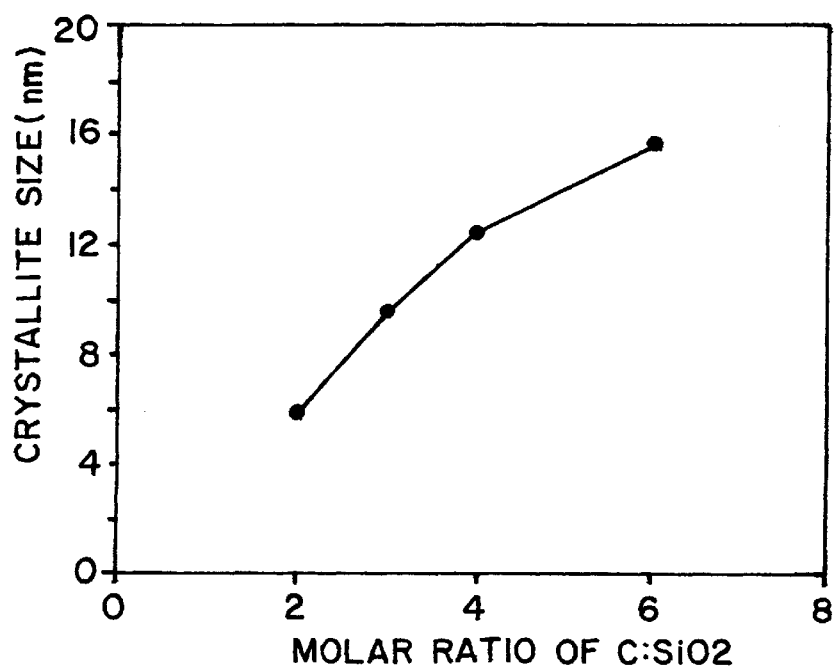
FIG. 2 is a graph showing in the effect of molar ratio of carbon: $SiO_2$ on crystallite size of $SiO_2$ as-milled $SiO_2$/graphite powder.
Figure 3:
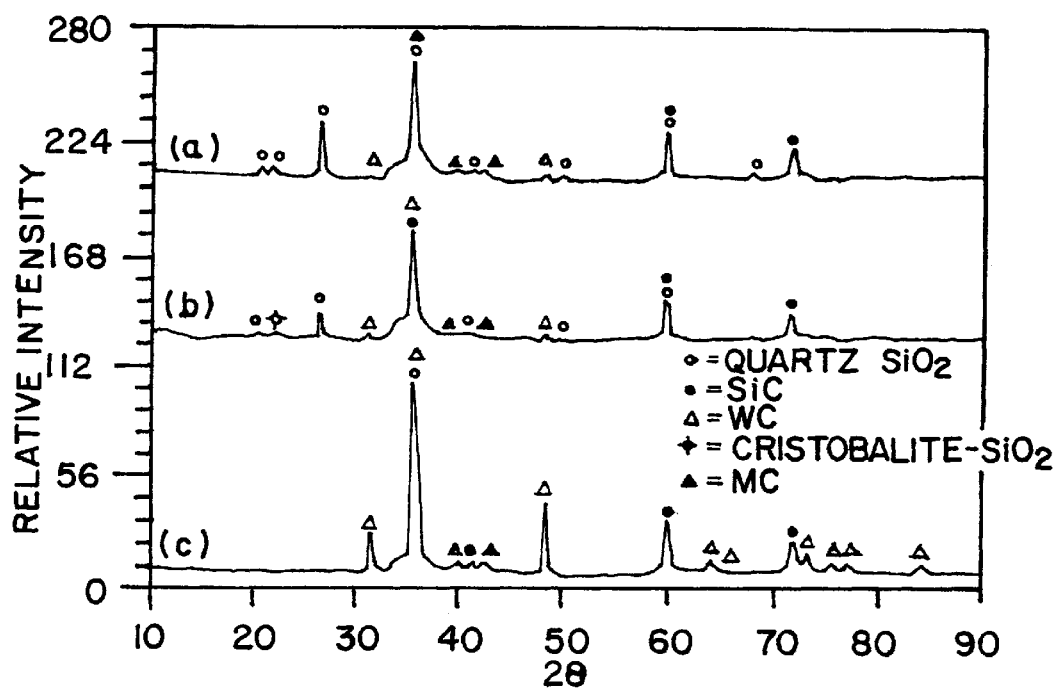
FIG. 3 shows XRD patterns demonstrating the effect of high-energy milling time on formation of SiC from $SiO_2$ and graphite powder mixtures annealed at 1400° C. at $7\times10^{-4}$ torr for 1 hour for (a) 12 hours; (b) 24 hours; and (c) 48 hours milling time.

The key parameters for optimizing synthesis of high purity carbides in this first step include the ratio of the ball-to-powder weight (referred to herein as the charge ratio); the milling time; the composition and purity of the starting materials; the cooling conditions during milling; and the milling speed. As shown in FIGS. 1 and 2 respectively, the crystallite size of the as-milled powder mixture decreases with increasing milling time and increase with increasing the molar ratio of carbon:metal oxide. Reduction of the crystallite size of the as-milled powder in turn enhances the formation kinetics of the carbides during the annealing step as shown in FIG. 3. Thus where annealing time and temperature are held constant, an increase in milling time results in finer crystallite sizes and more uniform mixing, thereby resulting in an increase in the amount of formed SiC.

The second step in accordance with the present method comprises annealing of the as-milled powders, that is, heating the as-milled powder mixture at a specified temperature. Heating in the range from between about 500° C. to about 1500° C. results in the formation of submicron-sized, nanostructured carbides. Heating in the range from about 1500° C. to about 1800° C. results in the formation of micron-sized particles.

Annealing is preferably conducted under a flow of inert gas i.e., argon, or at reduced pressure, preferably at less than 1000 millimeters. Either of these conditions will result in the removal of carbon monoxide gas from the reaction chamber, thereby driving the reaction to completion in about 1 to 2 hours. The reduced pressure should not be so low as to draw off either the reactants or the product. An acceptable minimum pressure depends on the form of reactants during the heating process, i.e., loose powder form or cold compacted (see Examples below).

Figure 4:
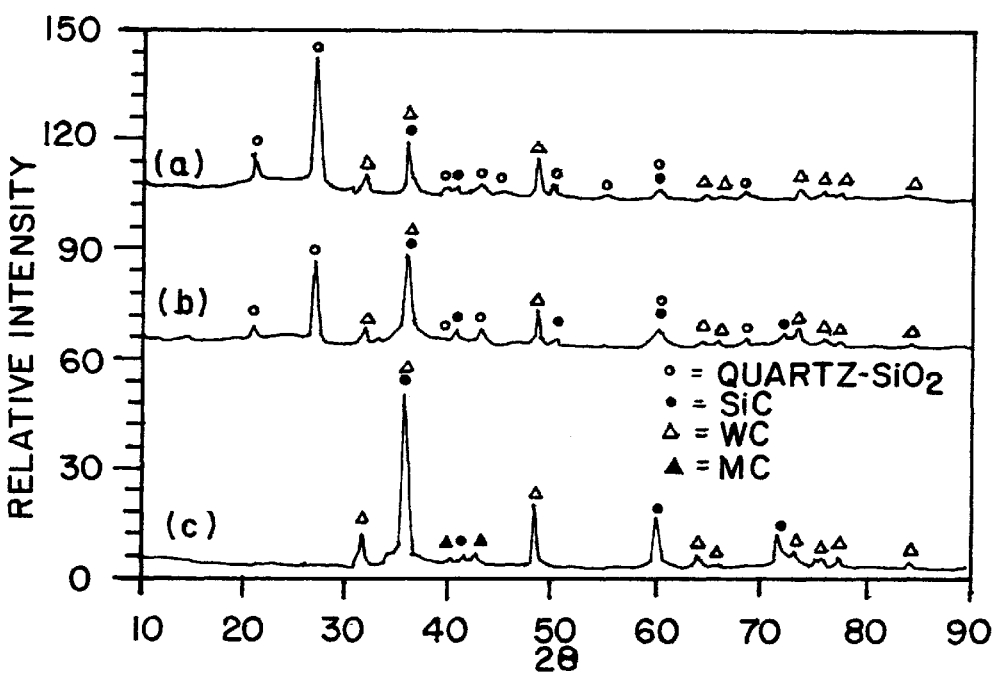
FIG. 4 shows XRD patterns demonstrating the effect of the annealing temperature on the formation of SiC from $SiO_2$ and graphite powder mixtures milled for 48 hours and annealed at $7\times10^{-4}$ torr for 1 hour at (a) 1200° C.; (b) 1300° C.; and (c) 1400° C.
Figure 5:
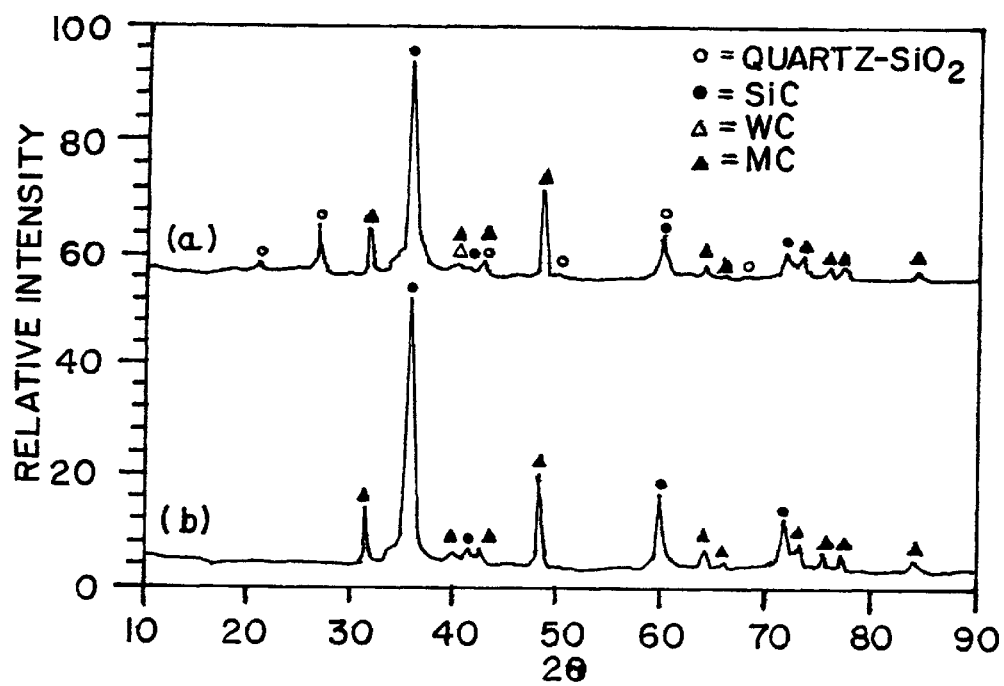
FIG. 5 shows XRD patterns demonstrating the effect of holding time during annealing on the formation of SiC from $SiO_2$ and graphite powder mixtures milled for 48 hours and annealed at 1400° C. at $7\times10^{-4}$ torr for (a) 15 minutes; and (b) 60 minutes.

The key parameters in this second step include the annealing temperature, the holding time, and the annealing atmospheric pressure. As shown in FIGS. 4 and 5 respectively, the formation of carbides is enhanced with use of higher annealing temperatures and longer annealing times.

The above-described method has a number of advantages over prior art methods. For example, milling after the carbothermic reduction is eliminated. Powder handling, including loading and removal from the canister and the furnace, are carried out in air, which substantially decreases costs as compared to processes requiring powder handling under an inert atmosphere.

The purity of the products is also increased. Although the XRD patterns of the annealed powders indicate the presence of both tungsten carbide and MC (M being a metal) in the final products, these contaminants derive from wear of the tungsten carbide balls and the wall of the canister used during high energy milling. Tungsten carbide contamination is prevented by using balls made of the carbide identical to that being synthesized, for example, SiC balls used for production of SiC powders and TiC balls for production of TiC powders. Both of these balls are commercially available. The MC contamination is prevented by use of carbide canisters or carbide-lined canister. Furthermore, a short milling time could be employed to prevent the contamination, as in the following examples that only use 1.5-hour milling times.

The examples set forth below illustrate the present invention. Those of ordinary skill in the art will recognize that there are numerous modifications and variations thereto, and that the present invention is not limited to such examples.

EXAMPLE 1

Synthesis of Nanocrystalline TiC

Anatase-$TiO_2$ powder (99.95% pure, mean diameter 0.3 μm, obtained from J. T. Baker Chemical Co., Phillipsburg, N.J.) is mixed with graphite powder (99.9% pure, mean diameter less than 10 μm, obtained from Johnson Matthey, Ward Hill, Mass.) and tungsten carbide balls (4.76 mm diameter) to prepare a powder and ball mixture having a molar ratio of carbon:oxide of 4:1, and the charge ratio of the ball:powder weight of 60:1. This powder and ball mixture is loaded into the milling canister of modified Szegvari attritor in accordance with the procedure set forth in "Synthesis of Nanocrystalline SiC at Ambient Temperature Through High Energy Reaction Milling", Z.-G. Yang and L. L. Shaw, Nanostructured Materials, Vol. 7, pp. 873–886 (1996), incorporated herein by reference in its entirety. Before milling, the charged canister is evacuated to $10^{-2}$ torr, flushed with argon, evacuated, and then back-filled with argon having a of purity 99.95%, at a pressure of about 1.5 atm. The milling canister is then cooled using circulation water with a flow rate of about 770 mL/min, and this cooling is maintained throughout the process. The temperature of the canister is monitored using an E-type thermocouple attached to the bottom of the canister. The mixture is then milled using a milling speed of 600 RPM.

Figure 6:
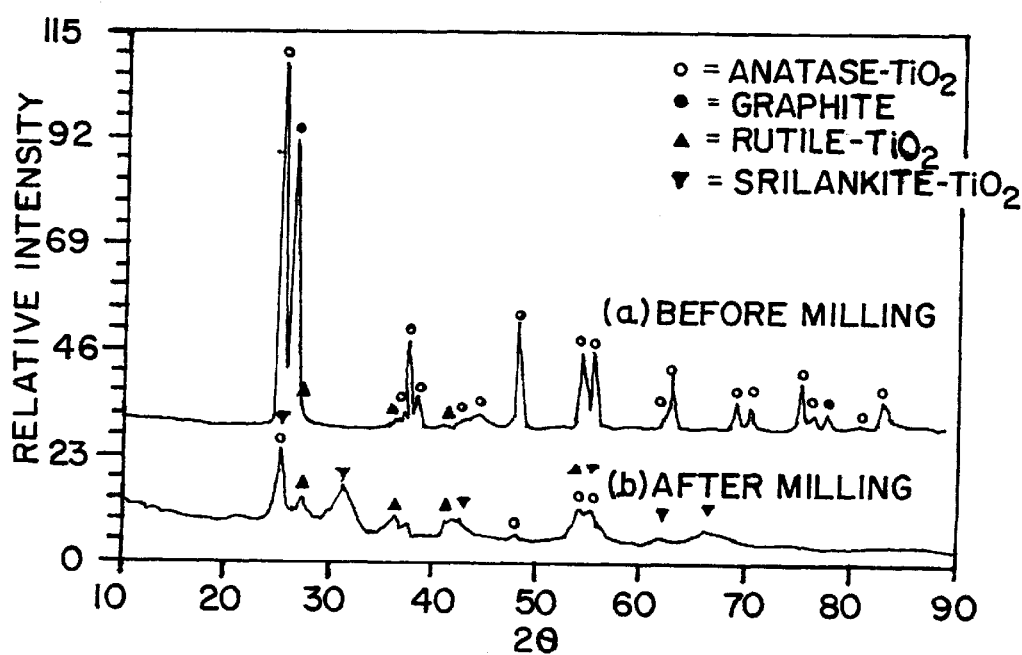
FIG. 6 shows XRD patterns of graphite and $TiO_2$ powder mixtures having a carbon:oxide molar ratio of 4:1 (a) mixed without the high-energy milling in accordance with the present invention; and (b) milled for 24 hours in accordance with the present invention.

After milling for 24 hours, samples of the as-milled powder mixture are analyzed via X-ray diffraction (XRD), transmission electron microscopy (TEM), scanning election microscopy (SEM), and surface area analysis. The XRD and TEM examination suggest that the graphite powder has been transformed to an amorphous phase, and that while some of the anatase-$TiO_2$ is amorphous, some also transforms to other polymorphic structures such as rutile- and srilankite-$TiO_2$, and some retains anatase crystal structure, but is nanostructured (FIG. 6).

The as-milled powder is cold-compacted into a disc having a height of 2 mm and diameter of 15 mm. The disc is heated to 1300° C. at a heating rate of about 60° C./min, and then held at the designated temperature under flowing argon gas having a of purity 99.95% for 1 hour. The disc is then furnace-cooled to room temperature and removed from the furnace.

X-ray diffraction analysis of the annealed specimen (FIG. 7) shows that nanocrystalline TiC was formed from the milled powder mixture with no detectable $TiO_2$ or graphite. The crystallite size, as determined from the line broadening of the XRD spectrum, is 26 nm, while the particle size, as estimated from SEM ranges from about 50–200 nm.

Figure 7:
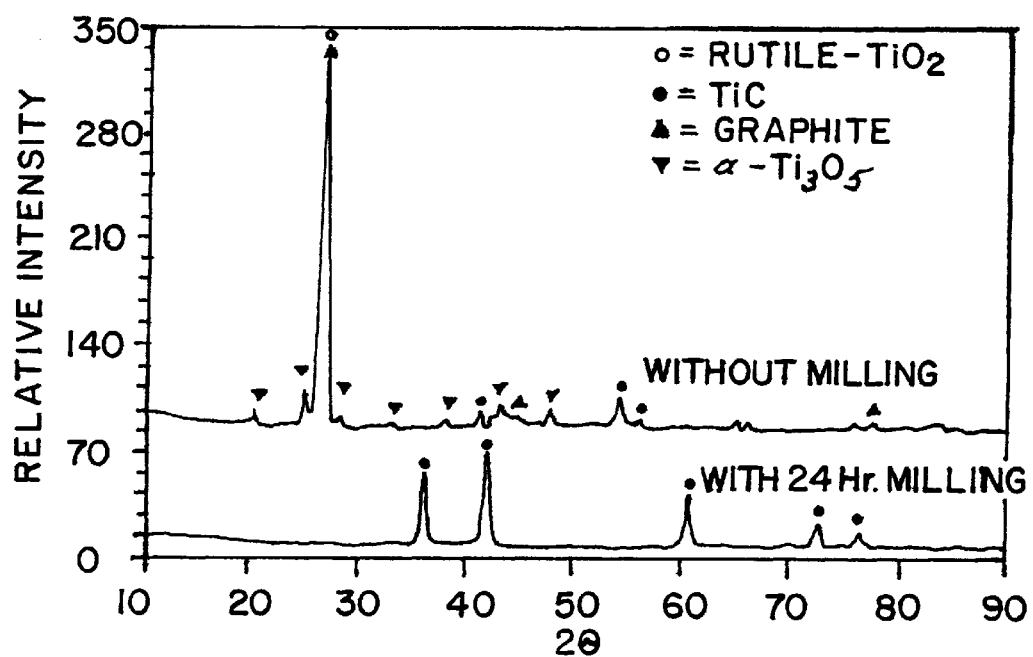
FIG. 7 shows XRD patterns of graphite and $TiO_2$ powder mixtures annealed at 1300° C. under a flowing argon gas atmosphere, wherein (a) the powders were simply mixed, without high energy milling; and (b) the powders are milled for 24 hours in accordance with the method of the present invention.

A comparative experiment shows that no TiC was formed if the $TiO_2$ and graphite powders are simply mixed and then annealed in the absence of a high-energy milling treatment (FIG. 7). These data clearly indicate that the formation of TiC through the carbothermic reduction of $TiO_2$ is greatly enhanced by high energy milling. Furthermore, the powder particles are synthesized on submicron scale with nanostructures.

EXAMPLE 2

Synthesis of Nanocrystalline SiC $SiO_2$ (99.5% purity, mean diameter 2 μm, obtained from Johnson Matthey, Ward Hill, Mass.) is mixed with graphite powder (99.9% purity, mean diameter less than 10 μm) and WC balls (4.76 mm diameter) to prepare a powder and ball mixture having carbon:oxide molar ratio of 4:1 and ball-:powder charge of 60:1. This powder and ball mixture is milled using the conditions described in Example above. After milling for 1.5 hours, samples of the powder mixture are analyzed via XRD, TEM, SEM and surface area analysis. The XRD and TEM analysis indicate that some graphite powder is transformed to an amorphous phase, and that while some of the $SiO_2$ becomes amorphous, some remains crystalline.

The milled powder is loosely placed into an alumina boat and heated to 1500° C. at a heating rate of about 60° C./min, and held at this temperature under an argon atmosphere for 1 hour. The annealed carbide is furnace cooled to room temperature and then removed from the furnace.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for the synthesis of metal carbide powders, comprising
   providing a mixture of a metal oxide and a carbon source;
   ball milling the mixture to form an as-milled powder; and
   annealing the as-milled powder under subatmospheric pressure, thereby forming a metal carbide powder.

2. The method as set forth in claim 1, wherein
   the oxide is an oxide of silicon, titanium, thorium, hafnium, vanadium, chromium, tungsten, tantalum, niobium, zirconium, or a combination thereof.

3. The method as set forth in claim 2, wherein
   the oxide is an oxide of silicon or titanium.

4. The method as set forth in claim 1, wherein
   the carbon source is graphite, coal, thermal black, acetylene black, coke, or a combination thereof.

5. The method as set forth in claim 1, wherein
   the ball milling is performed using an attritor.

6. The method as set forth in claim 1, wherein
   annealing is carried out under a flow of inert gas.

7. The method as set forth in claim 1, wherein
   annealing is at a temperature in the range from about 500° C. to about 1500° C.

8. The method as set forth in claim 1, wherein
   annealing is at a temperature in the range from about 1500° C. to about 1800° C.

9. A method for the synthesis of micron- or submicron-sized, nanostructured metal carbide powders, comprising
   providing a mixture of metal oxide and a carbon source;
   ball milling the mixture for 2 to 48 hours to form an as-milled powder; and
   annealing the as-milled powder at a temperature in the range from about 500° C. to about 1500° C., thereby forming micron- or submicron-sized, nanostructured metal carbide powders.

10. The method as set forth in claim 9, wherein
    the oxide is an oxide of silicon, titanium, thorium, hafnium, vanadium, chromium, tungsten, tantalum, niobium, zirconium, or a combination thereof.

11. The method as set forth in claim 10, wherein
    the oxide is an oxide of silicon or titanium.

12. The method as set forth in claim 9, wherein
    the carbon source is graphite, coal, thermal black, acetylene black, coke, or a combination thereof.

13. The method as set forth in claim 9, wherein
    annealing is carried out under a flow of inert gas for about 1 to 2 hours.

14. The method as set forth in claim 9, wherein
    annealing is carried out under subatmospheric pressure for about 1 to 2 hours.

15. A method for the synthesis of micron-sized metal carbide powders, comprising
    providing a mixture of metal oxide and a carbon source;
    ball milling the mixture for 2 to 48 hours to form an as-milled powder; and
    annealing the as-milled powder at a temperature in the range from about 500° C. to about 1500° C., thereby forming micron- or submicron-sized, nanostructured metal carbide powders.

16. The method as set forth in claim 15, wherein
    the oxide is an oxide of silicon, titanium, thorium, hafnium, vanadium, chromium, tungsten, tantalum, niobium, zirconium, or a combination thereof.

17. The method as set forth in claim 15, wherein the oxide is an oxide of silicon or titanium.

18. The method as set forth in claim 15, wherein the carbon precursor is graphite, coal, thermal black, acetylene black, coke, or a combination thereof.

19. The method as set forth in claim 15, wherein annealing is carried out under a flow of inert gas for about 2 to 15 hours.

20. The method as set forth in claim 15, wherein annealing is carried out under subatmospheric pressure for about 2 to 15 hours.

21. A method for the synthesis of metal carbide powders, comprising providing a mixture of a metal oxide and a carbon source;

dry ball milling the mixture to form an as-milled powder; and annealing the as-milled powder, thereby forming a metal carbide powder.

22. The method as set forth in claim 21, wherein the oxide is an oxide of silicon, titanium, thorium, hafnium, vanadium, chromium, tungsten, tantalum, niobium, zirconium, or a combination thereof.

23. The method as set forth in claim 22, wherein the oxide is an oxide of silicon or titanium.

24. The method as set forth in claim 21, wherein the carbon source is graphite, coal, thermal black, acetylene black, coke, or a combination thereof.

25. The method as set forth in claim 21, wherein dry ball milling is performed using an attritor.

26. The method as set forth in claim 21, wherein annealing is carried out under a flow of inert gas.

27. The method as set forth in claim 21, wherein annealing is carried out under subatmospheric pressure.

28. The method as set forth in claim 21, wherein annealing is at a temperature in the range from about 500° C. to about 1500° C.

29. The method as set forth in claim 21, wherein annealing is at a temperature in the range from about 1500° C. to about 1800° C.

30. A method for the synthesis of micron- or submicron-sized, nanostructured metal carbide powders, comprising providing a mixture of a metal oxide and a carbon source;

dry ball milling the mixture for 2 to 48 hours to form an as-milled powder; and annealing the as-milled powder at a temperature in the range from about 500° C. to about 1500° C., thereby forming micron- or submicron-sized, nanostructured metal carbide powders.

31. The method as set forth in claim 30, wherein the oxide is an oxide of silicon, titanium, thorium, hafnium, vanadium, chromium, tungsten, tantalum, niobium, zirconium, or a combination thereof.

32. The method as set forth in claim 31, wherein the oxide is an oxide of silicon or titanium.

33. The method as set forth in claim 30, wherein the carbon source is graphite, coal, thermal black, acetylene black, coke, or a combination thereof.

34. The method as set forth in claim 30, wherein annealing is carried out under a flow of inert gas for about 1 to 2 hours.

35. The method as set forth in claim 30, wherein annealing is carried out under subatmospheric pressure for about 1 to 2 hours.

36. A method for the synthesis of micron-sized metal carbide powders, comprising providing a mixture of a metal oxide and a carbon source;

dry ball milling the mixture for 2 to 48 hours to form an as-milled powder; and annealing the as-milled powder at a temperature in the range from about 1500° C. to about 1800° C., thereby forming micron-sized metal carbide powders.

37. The method as set forth in claim 36, wherein the oxide is an oxide of silicon, titanium, thorium, hafnium, vanadium, chromium, tungsten, tantalum, niobium, zirconium, or a combination thereof.

38. The method as set forth in claim 37, wherein the oxide is an oxide of silicon or titanium.

39. The method as set forth in claim 36, wherein the carbon source is graphite, coal, thermal black, acetylene black, coke, or a combination thereof.

40. The method as set forth in claim 36, wherein annealing is carried out under a flow of inert gas for about 2 to 15 hours.

41. The method as set forth in claim 36, wherein annealing is carried out under subatmospheric pressure for about 2 to 15 hours.

\* \* \* \* \*